(12) United States Patent
Smith (10) Patent No.: US 9,980,437 B2
(45) Date of Patent: May 29, 2018

(54) BALING SYSTEM HAVING A BALE POSITION SENSOR (71) Applicant: CNH Industrial America LLC, New Holland, PA (US)

(72) Inventor: Kevin M. Smith, Narvon, PA (US)

(73) Assignee: CNH Industrial American LLC, New Holland, PA (US)

( * ) Notice: Subject to any disclaimer, the term of this patent is extended or adjusted under 35 U.S.C. 154(b) by 1101 days.

(21) Appl. No.: 14/225,204

(22) Filed: Mar. 25, 2014

(65) Prior Publication Data
US 2015/0272007 A1 Oct. 1, 2015

(51) Int. Cl.
A01F 15/08 (2006.01)
A01F 15/07 (2006.01)
A01D 90/10 (2006.01)

(52) U.S. Cl.
CPC .......... *A01F 15/0883* (2013.01); *A01D 90/10* (2013.01)

(58) Field of Classification Search
CPC .. A01F 15/0883; A01F 15/0705; A01F 15/07; A01D 87/127; A01D 90/10
USPC .......... 100/87, 88, 89, 7, 188 R, 45; 56/341
See application file for complete search history.

(56) References Cited

U.S. PATENT DOCUMENTS

| | | | |
|---|---|---|---|
| 4,566,380 A | 1/1986 | Clostemeyer et al. | |
| 4,624,179 A | 11/1986 | Yves et al. | |
| 4,674,403 A | 6/1987 | Bryant et al. | |
| 5,551,218 A | 9/1996 | Henderson et al. | |
| 5,557,510 A | 9/1996 | McIntyre et al. | |
| 6,675,561 B2* | 1/2004 | Davis | A01F 15/0715 100/4 |
| 6,807,901 B2 | 10/2004 | Bentzinger et al. | |
| 6,892,632 B1 | 5/2005 | Viesselmann et al. | |
| 7,000,533 B2 | 2/2006 | Derscheid et al. | |
| 7,472,649 B1 | 1/2009 | Derscheid et al. | |

(Continued)

FOREIGN PATENT DOCUMENTS

| | | |
|---|---|---|
| EP | 0206889 A1 | 12/1986 |
| EP | 0974259 A1 | 1/2000 |

(Continued)

OTHER PUBLICATIONS

Extended EP Search Report for EP Application No. 15160933.6 dated Aug. 18, 2015; 5pgs.

(Continued)

*Primary Examiner* — Jimmy T Nguyen
(74) *Attorney, Agent, or Firm* — Rebecca L. Henkel; Rickard K. DeMille (57) ABSTRACT

A system includes a baling chamber designed to form a round bale and a tailgate rotatably coupled to the baling chamber. The tailgate rotates between a closed position that facilitates formation of the round bale and an open position that facilitates ejection of the round bale from the baling chamber. The system includes a ramp coupled to the baling chamber. The ramp is designed to receive the round bale upon ejection from the baling chamber and to direct the round bale away from the baling chamber to a cleared position on the ramp that enables the tailgate to rotate from the open position to the closed position without contacting the round bale. The system also includes a sensor coupled to a distal end of the ramp. The sensor is designed to detect presence of the round bale in the cleared position.

20 Claims, 5 Drawing Sheets

(56) References Cited

U.S. PATENT DOCUMENTS

| | | |
|---|---|---|
| 7,584,696 B2 | 9/2009 | Verhaeghe et al. |
| 2005/0217233 A1 | 10/2005 | Smith et al. |
| 2011/0023435 A1 | 2/2011 | Matousek et al. |
| 2011/0060507 A1 | 3/2011 | Vanhercke et al. |
| 2012/0189417 A1 | 7/2012 | Blough |

FOREIGN PATENT DOCUMENTS

| | | |
|---|---|---|
| EP | 1034695 A1 | 9/2000 |
| WO | 2011033357 A2 | 3/2011 |
| WO | 2012146582 A | 11/2012 |

OTHER PUBLICATIONS

HAYTALK; http://www.haytalk.com/forums/topic/15574-case-ih-8430-round-bale-ejectorkicker/; Nov. 12, 2011.

\* cited by examiner

BALING SYSTEM HAVING A BALE POSITION SENSOR

BACKGROUND

The invention relates generally to a baling system having a bale position sensor.

A baler may be used to consolidate and package crop material. In some cases, crop material is cut and left in an agricultural field for windrow drying in the sun. When the crop material is sufficiently dried, a baler (e.g., round baler, square baler, etc.) may be used to collect the dry crop material and prepare it for sale or other uses. The baler typically has a mechanism that collects the crop material from the ground and directs the crop material toward a bale forming chamber. For round balers, a series of belts and rollers inside the bale forming chamber compress the crop material to form a cylindrically shaped bale. In some cases, the baler may include a wrapping mechanism to wrap the completed bale in twine or a net to maintain the shape of the bale.

Once the baler forms a completed bale, an operator deposits the bale in the agricultural field for later collection. Certain round balers include a tailgate that is rotatably attached to the bale forming chamber. Upon formation of the bale, the operator opens the tailgate to eject the completed bale. Alternatively, the tailgate may open automatically when a completed bale is formed. Once the tailgate is open, the bale rolls down a ramp, which is attached to the baler to the ground. Then, the operator closes the tailgate and continues collecting the remaining crop material.

Unfortunately, it may be difficult for the operator to determine when to close the tailgate because the operator may not know exactly how long it takes for the completed bale to leave the bale forming chamber and clear the tailgate. In other words, the operator may not know exactly when the bale has moved to a position on the ramp in which the tailgate may be rotated from the open position to the closed position without contacting the bale. Accordingly, the operator may wait an undesirably long time before closing the tailgate to ensure that the bale is clear. Because a subsequent bale may not be formed until the tailgate is closed, the lost time leads to longer durations to complete baling operations and wasted fuel while machinery is idling in the field waiting for the tailgate to close.

BRIEF DESCRIPTION

In one embodiment, a system includes a baling chamber designed to form a round bale and a tailgate rotatably coupled to the baling chamber. The tailgate is designed to rotate between a closed position that facilitates formation of the round bale and an open position that facilitates ejection of the round bale from the baling chamber. The system also includes a ramp coupled to the baling chamber. In some embodiments, the ramp is designed to receive the round bale upon ejection from the baling chamber. The ramp is designed to direct the round bale away from the baling chamber to a cleared position on the ramp that enables the tailgate to rotate from the open position to the closed position without contacting the round bale. The system also includes a sensor coupled to a distal end of the ramp. The sensor is designed to detect presence of the round bale in the cleared position.

In another embodiment, a system includes a ramp. The ramp is designed to receive a round bale from a baling chamber. The ramp is also designed to direct the round bale away from the baling chamber to a cleared position on the ramp that enables a tailgate to rotate from an open position to a closed position without contacting the round bale. The system also includes a sensor coupled to a distal end of the ramp. The sensor is designed to detect presence of the round bale in the cleared position. Further, the sensor is designed to output a signal indicative of a position of the bale.

In a further embodiment, a system includes a baling chamber designed to form a round bale and a tailgate rotatably coupled to the baling chamber. The tailgate is designed to rotate between a closed position that facilitates formation of the round bale and an open position that facilitates ejection of the round bale from the baling chamber. The system also includes a ramp coupled to the baling chamber. In some embodiments, the ramp is designed to receive the round bale upon ejection from the baling chamber. The ramp is designed to direct the round bale away from the baling chamber to a cleared position on the ramp that enables the tailgate to rotate from the open position to the closed position without contacting the round bale. In some embodiments, the system further includes an actuator assembly coupled to the tailgate. The actuator assembly is designed to rotate the tailgate between the open position and the closed position. The system also includes a sensor coupled to a distal end of the ramp. The sensor is designed to detect presence of the round bale in the cleared position. Further, the system includes a controller communicatively coupled to the sensor. The controller is designed to instruct the actuator assembly to rotate the tailgate from the open position to the closed position upon detection of the round bale in the cleared position.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The embodiments disclosed herein include a bale position sensor configured to enable a baler tailgate to begin closing as soon as the bale moves to a cleared position in which the tailgate may be rotated from the open position to the closed position without contacting the bale. Instead of waiting for the bale to move completely off a ramp, the bale position sensor gives an indication that the tailgate can start closing while the bale is still on the ramp (i.e., in the cleared position on the ramp). The earlier closing indication enables the tailgate to be closed sooner, which leads to less time idling in a field, decreases the amount of time a baling operation takes, and reduces the amount of fuel used while the equipment sits idle waiting to close the tailgate. By way of example, some balers may not begin closing the tailgate until the bale is off the ramp and the ramp has returned to a raised position. Consequently, baling operations take longer because of the lost time caused by the delay in closing the tailgate. However, starting to close the tailgate sooner (i.e., while the bale is in a cleared position on the ramp) may decrease the amount of time the baling operation takes. In certain embodiments, the bale position sensor is communicatively coupled to a controller, which is configured to override commands to close the tailgate while the bale is in an interfering position (i.e., a position in which the tailgate would contact the bale if the tailgate were rotated from the open position to the closed position). The controller may also automatically control the position of the tailgate based on feedback from the bale position sensor.

Figure 1:
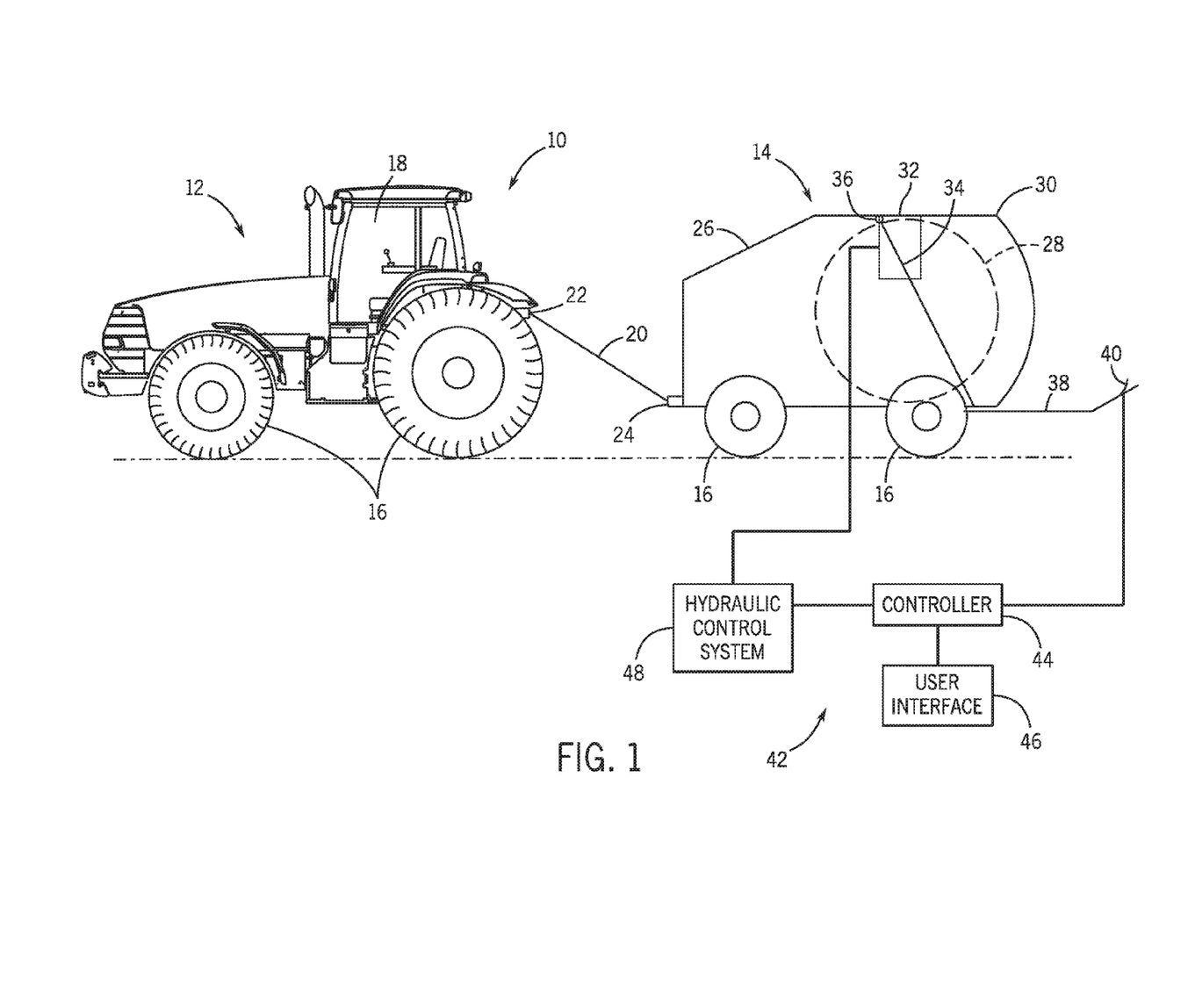
FIG. 1 is a schematic side view of an embodiment of a bale collection system.

FIG. 1 is a schematic side view of an embodiment of a bale collection system 10. In the illustrated embodiment, the system 10 includes a tractor 12 and a round baler 14. The tractor 12 has wheels 16 that enable the tractor 12 to move across an agricultural field and drive movement of the baler 14. Moreover, the tractor 12 has a cab 18 for an operator to control the bale collection process. For example, the operator may be able to start and stop the operation of the round baler 14 from the cab 18.

The tractor 12 couples to the baler 14 using a tongue 20 mounted on a hitch 22. Coupling the tractor 12 and baler 14 together enables the tractor 12 to guide the baler 14 around the agricultural field. As such, the tractor 12 can guide the baler 14 toward crop material deposited in windrows on the agricultural field. To collect the crop material, the baler 14 includes a crop collector 24 mounted on the front end of the baler 14. The crop collector 24 may have a rotating wheel that collects the crop material from the ground and directs the crop material toward a bale chamber 26. Inside the bale chamber 26, rollers, belts, and/or other devices compact the crop material to form a generally cylindrically shaped bale 28. The bale 28 is contained within the baler 14 until ejection of the bale 28 is instructed (e.g., by the operator). In certain embodiments, the bale 28 may be automatically ejected from the baler 14 once the bale 28 is formed.

As mentioned above, the bale 28 is contained within the baler 14 until ejected by the operator or automated system. The bale 28 is confined within a volume defined by the bale chamber 26 and a tailgate 30. In the illustrated embodiment, the tailgate 30 is rotatably coupled to the bale chamber 26. Rotation of the tailgate 30 is controlled by an actuator assembly 32. In some embodiments, the actuator assembly 32 includes a hydraulic system. However, in other embodiments, the actuator assembly 32 may include a pulley system, electric motor, or the like to rotate the tailgate 30. The tailgate 30 is configured to rotate between closed and open positions. The closed position (shown in FIG. 1) confines the bale 28 within the baler 14. In other words, in the closed position the tailgate 30 contacts the bale chamber 26 along the connection seam 34 and blocks movement of the bale 28 from the baler 14. Conversely, in the open position (shown in FIG. 2) the tailgate 30 enables the bale 28 to be ejected from the baler 14. To transition to the open position, the tailgate 30 rotates about the rotation axis 36 such that the tailgate 30 no longer contacts the bale chamber 26 along the connection seam 34.

The bale 28 may be ejected once the tailgate 30 is in the open position. In the illustrated embodiment, the baler 14 has a ramp 38 configured to receive and direct the bale 28 away from the baler 14 once the bale 28 is ejected from the bale chamber 26. The ramp 38 may be spring loaded, such that the ramp is urged into a raised position, as illustrated. The weight of the bale 14 on the ramp 38 drives the ramp 38 to a lowered position in which the ramp 38 directs the bale 14 to the soil surface. In other embodiments, the ramp may be driven to rotate between the raised and lowered positions by a hydraulic motor, an electric motor, or the like. Once the bale 28 is ejected, the bale 28 may roll down the ramp 38 and be deposited onto the agricultural field. The ramp may enable the bale 28 to maintain its shape and desired density by gently guiding the bale 28 to the agricultural field.

In the illustrated embodiment, a bale position sensor 40 is coupled to the distal end 49 of the ramp 38. The sensor 40 is configured to detect presence of the bale 28 in the cleared position. For example, in one embodiment, the bale 28 may activate the sensor 40 as the bale 28 moves down the ramp 38. Once activated, the sensor 40 outputs a signal indicating the position of the bale 28. In some embodiments, activation of the sensor 40 may correspond to the bale 28 being in the cleared position. However, in another embodiment, the activation and subsequent deactivation of the sensor 40 may indicate the bale 28 is in the cleared position. As described in detail below, when the bale 28 is in the cleared position the tailgate 30 may rotate to the closed position without contacting the bale 28.

To facilitate management of the baling process, the system 10 includes a control system 42. In the illustrated embodiment, the control system includes a controller 44, a user interface 46, and a hydraulic control system 48. The controller 44 is configured to receive signals from the operator through the user interface 46 and from sensors (e.g., the bale position sensor 40) associated with the baling system 10. Moreover, the controller 44 is configured to send signals to the hydraulic control system 48 to operate valve(s) that control fluid flow to a tailgate lift cylinder, among other hydraulic cylinder(s)/motor(s). For example, the user interface 46 may send a signal to the controller 44 to open the tailgate 30 (e.g., via user interaction with the user interface 46 after the bale 28 is formed). The controller 44 receives the signal from the user interface 46 and sends a control signal to the hydraulic control system 48 to activate a piston (e.g., via pumps, valves, etc.) that rotates the tailgate 30 from the closed position to the open position. Alternatively, the controller 44 may receive a signal from a sensor indicating the bale 28 is formed within the baler 14. The controller 44 may then automatically send a control signal to the hydraulic control system 48 to initiate opening of the tailgate 30. In certain embodiments, the controller is also configured to send signals to the user interface 46 to provide feedback to the operator. For example, the controller 44 may receive a signal from a sensor within the baler 14 indicating that the bale 28 has been formed in the bale chamber 26. Thereafter, the controller 44 may send a signal to the user interface 46 to inform the operator that the bale 28 is formed and ready for ejection. As will be appreciated by one skilled in the art, any combination of signals to and/or from the user interface 46 and controller 44 may be utilized to eject the bale 28 from the baler 14.

Figure 2:
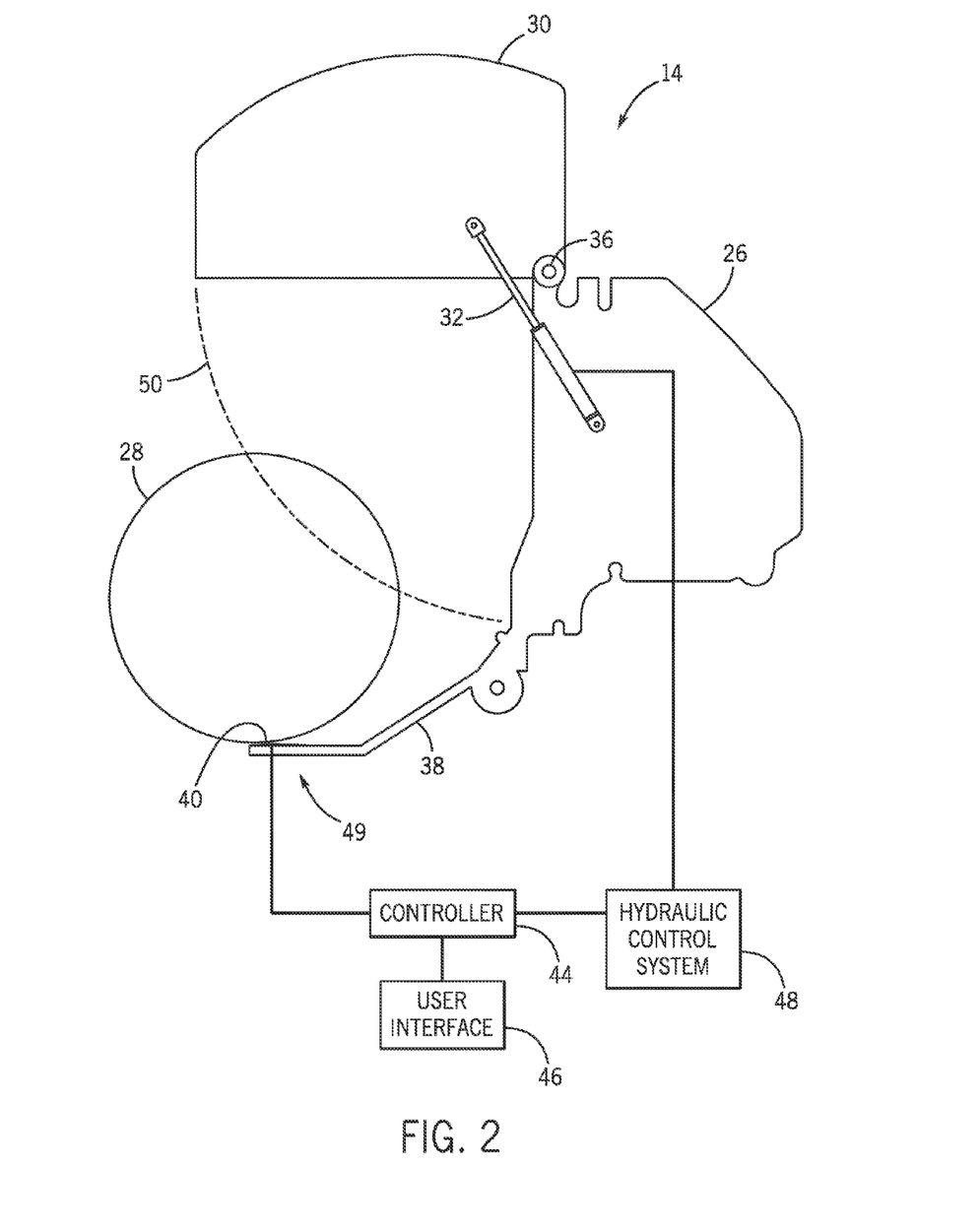
FIG. 2 is a schematic side view of an embodiment of a baler that may be used within the bale collection system of FIG. 1, in which a tailgate of the baler is in an open position.

FIG. 2 is a schematic side view of an embodiment of the baler 14 with the tailgate 30 in the open position and the bale 28 in proximity to the bale position sensor 40. As previously discussed, the tailgate 30 may be moved into the open position by the actuator assembly 32, which is controlled by the hydraulic control system 42 and the controller 44 in the illustrated embodiment. With the tailgate 30 in the open position, the bale 28 may be ejected from the bale chamber 26. The bale 28 may then roll onto the ramp 38 and away from the baler 14. In certain embodiments, the ramp 38 may shift to the lowered position due to the weight of the bale 28. In other words, a distal end 49 of the ramp 38 may move closer to the ground due to the weight of the bale 28. The bale 28 may continue to move (e.g., roll) along the ramp 38 until it is deposited onto the agricultural field.

Coupling the bale position sensor 40 to the distal end 49 of the ramp 38 places the bale position sensor 40 along the path of travel of the bale 28 as the bale 28 is ejected from the bale chamber 26. Placement along the path of travel enables the bale position sensor 40 to detect the presence of the bale 28 as the bale 28 moves along the ramp 38 away from the bale chamber 26. For example, by placing the bale position sensor 40 at the distal end 49 of the ramp 38, the bale position sensor 40 may detect presence of the bale 28 before the bale 28 leaves the ramp 38. Moreover, the bale position sensor 40 is positioned in a location on the ramp 38 that enables the sensor 40 to detect whether the bale is in a cleared position (i.e., a position that enables the tailgate to rotate from the open position to the closed position without contacting the bale). For example, the bale position sensor 40 may output a signal indicating that the bale is in the cleared position when the bale 28 is on the ramp 38 and positioned within a closing path 50 of the tailgate 30. However, due to the delay associated with rotating the tailgate 30 from the open position to the closed position, the bale 28 moves outside of the closing path 50 before the tailgate 30 contacts the bale 28. Therefore, the cleared position may include the bale 28 being out of the closing path 50 or the bale 28 being in the closing path 50 when the tailgate 30 begins to close because the bale 28 is predicted to be out of the closing path 50 when the tailgate 30 reaches the position of the bale 28. Accordingly, the bale position sensor 40 facilitates early detection of the bale 28 moving to the cleared position, which reduces the delay associated with closing the tailgate 30.

As previously discussed, the bale position sensor 40 is configured to detect the presence of the bale 28. For example, the bale position sensor 40 may be a leaf spring switch that, when compressed by the bale 28, closes a circuit and sends a signal to the controller 44. However, the bale position sensor 40 may also include other types of sensors (e.g., contact sensors or non-contact sensors). For instance, the bale position sensor 40 may include the leaf spring switch, a strain gauge, a momentary switch, or the like. The leaf spring switch and momentary switch may physically contact the bale 28 (e.g., the bale 28 rolls over the switches) to facilitate detection. Additionally, the strain gauge may measure the deflection of the ramp 38 to determine the location of the bale 28 on the ramp 38. However, in some cases, the bale position sensor 40 is able to detect the bale 28 and send the signal to the controller 44 without contacting the bale 28. That is, non-contact sensors such as a capacitive sensor, a Hall Effect sensor, an infrared sensor, an ultrasonic sensor, or the like may also be utilized. For example, a conductive or magnetic surface may be compressed against the ramp 38 when the bale 28 moves over the surface, indicating detection of the bale 28 and outputting a signal to the controller 44. Also, the infrared sensor may emit infrared light and analyze the energy returned. A difference in energy (i.e., from the presence of the bale 28) triggers a detection and subsequent output of a signal to the controller 44. Similarly, the ultrasonic sensor may emit sound waves (e.g., high frequency sound waves) and analyze the energy returned. A difference in energy (i.e., from the presence of the bale 28) triggers a detection and subsequent output of a signal to the controller 44.

While the bale 28 is being formed within the bale chamber 26, the bale position sensor 40 may be in an open or deactivated position. However, the bale position sensor 40 may transmit a signal once the bale 28 comes within contact or proximity of the bale position sensor 40, thereby indicating that the bale is in the cleared position. In other words, the presence of the bale 28 in the cleared position induces the bale position sensor 40 to output the signal.

Figure 3:
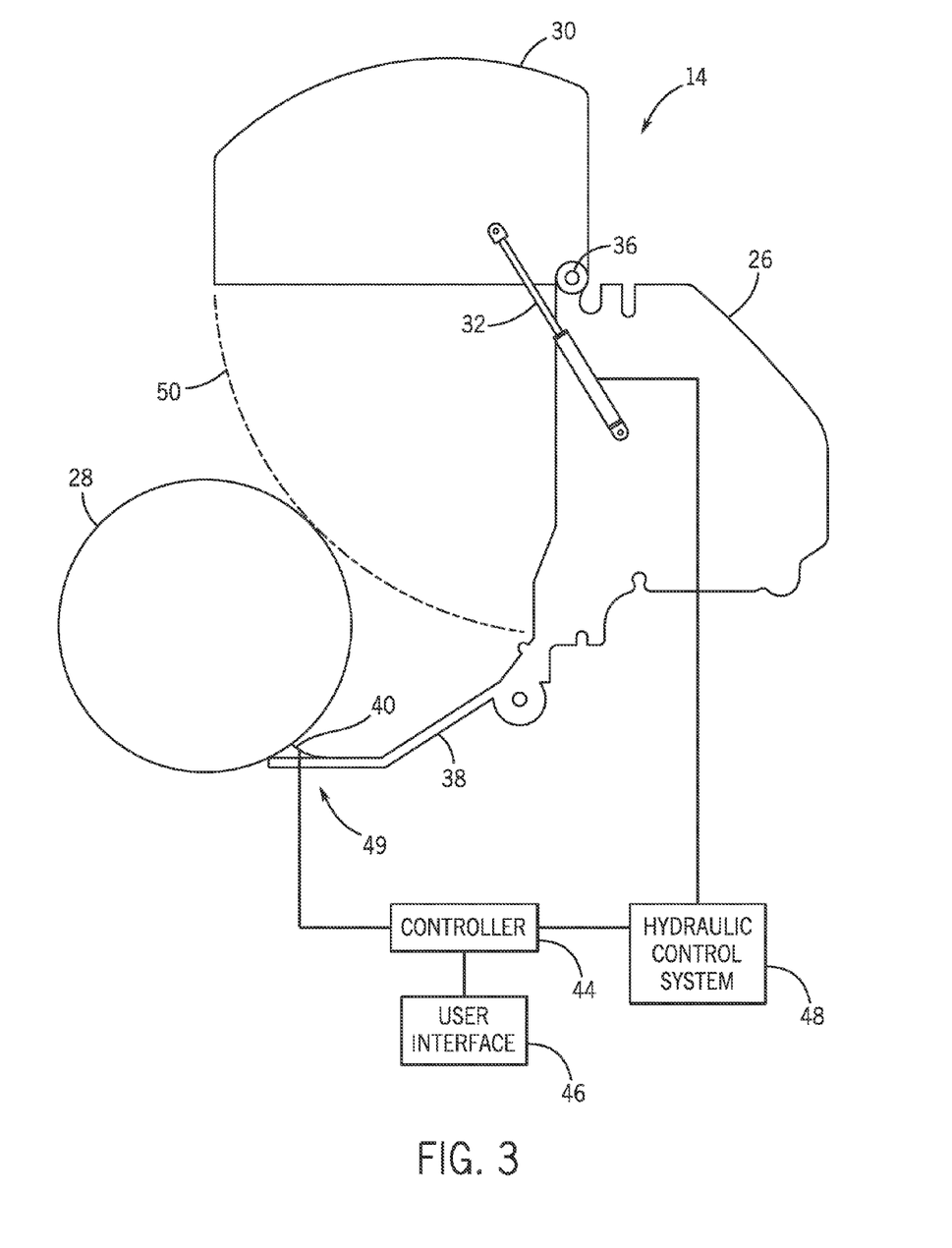
FIG. 3 is a schematic side view of an alternative embodiment of a baler having a bale position sensor.

FIG. 3 is a schematic side view of an alternative embodiment of a baler 14 having the bale position sensor 40. In the illustrated embodiment, the bale position sensor 40 is positioned along the ramp 38 to detect the presence of the bale 28 in the cleared position via sequential activation and deactivation of the sensor 40. For example, the sensor 40 may output a signal when the bale 28 is in contact or proximity to the sensor 40. However, when the bale 28 moves past the sensor 40 toward the soil surface, the signal terminates as the bale/sensor contact/proximity terminates. In such an embodiment, the controller 44 determines the bale 28 is in the cleared position when the controller 44 detects sequential activation and deactivation of the sensor 40. Alternatively, the sensor 40 may be configured to output a signal indicative of the bale 28 being in the cleared position upon deactivation of the sensor after previous activation. In other embodiments, the sensor 40 may be configured to output a signal indicative of the bale 28 being in the cleared position upon activation. For example, the sensor 40 may output a signal when the bale 28 is in contact or proximity to the sensor. In such an embodiment, the controller 44 determines the bale 28 is in the cleared position when the controller 44 detects activation of the sensor 40.

Once the bale 28 has moved past the bale position sensor 40 (e.g., the bale position sensor 40 is deactivated after having been previously activated), the bale 28 is in the cleared position. As previously discussed, the bale 28 may still be positioned along the closing path 50 while in the cleared position. However, in other embodiments, the cleared position may be outside of the closing path 50. Based on the activation and subsequent deactivation of the bale position sensor 40, the controller 44 determines that the bale 28 is in the cleared position. In certain embodiments, the activation of the bale position sensor 40 sends a signal to the controller 44 indicating that the bale 28 is traveling down the ramp 38 toward the distal end 49. Then, the subsequent deactivation of the bale position sensor 40 indicates that the bale 28 has continued to move along the ramp 38. At this point, the controller 44 may determine that the bale 28 is in the cleared position because of the activation and subsequent deactivation of the bale position sensor 40. However, as mentioned above, in some embodiments the activation of the bale position sensor 40 may send a signal to the controller 44 indicating that the bale 28 is in the cleared position. Moreover, in certain embodiments, the controller 44 may continue to monitor whether or not the bale 28 continues traveling down the ramp 38 toward the distal end 49. For example, although activation of the bale position sensor 40 may send a signal to the controller 44 indicating that the bale 28 is in the cleared position, the controller 44 may include a time delay feature to ensure the bale 28 keeps traveling down the ramp 38. In some embodiments, the time delay feature may wait a period of time (e.g., 1 second, 2 seconds, etc.) to determine if the sensor 40 is deactivated when the bale 28 moves down the ramp 38. If the sensor 40 is not deactivated within the set period of time, the controller 44 may send a signal to the hydraulic control system 48 to close a fluid valve to stop the closing of the tailgate 30.

Even if the bale 28 is positioned along the closing path 50 while the sensor 40 is deactivated, the controller 44 starts the closing process (e.g., the controller 44 sends a signal to the hydraulic control system 48 to open a fluid valve to drive a piston to retract and close the tailgate 30). The closing process may begin while the bale 28 is still positioned along the closing path 50 because the bale 28 is expected to move out of the closing path 50 by the time the tailgate 30 reaches the bale 28. In other words, the bale 28 is expected to be clear of the closing path 50 by the time the tailgate 30 reaches the intersection of the bale 28 and the closing path 50. As will be appreciated by one skilled in the art, the present disclosure facilitates closing the tailgate 30 sooner than a system that instructs the tailgate 30 to close when the bale 28 has left the ramp 38. As shown in FIG. 3, the bale 28 is still on the ramp 38, and the ramp 38 is still in the down position when the bale is in the cleared position. If a ramp position sensor were used to determine when to close the tailgate 30, the tailgate 30 would not be closed until a time when the bale 28 has past the cleared position, thereby delaying the closing process. Because the embodiments disclosed herein close the tailgate 30 sooner, the tractor spends less time idling in the field waiting for the bale 28 to clear the tailgate 30, thereby decreasing both the duration of the baling process and the cost of baling crop material (e.g., via reducing the fuel usage while idling).

Figure 4:
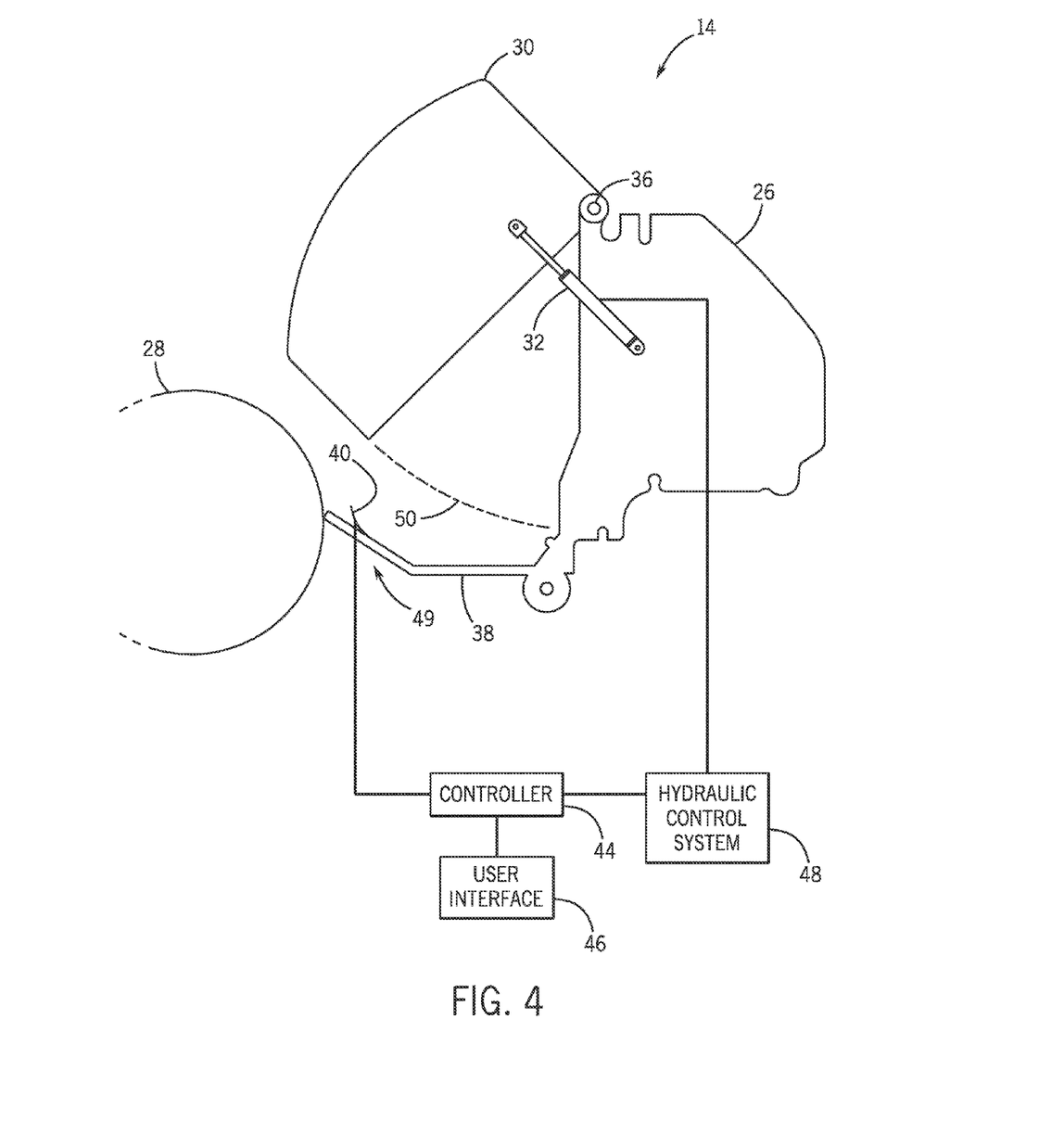
FIG. 4 is a schematic side view of the baler of FIG. 2, in which the tailgate is in a partially closed position and the round bale is off the ramp.

FIG. 4 is a schematic side view of the baler 14, in which the tailgate 30 is in a partially closed position and the round bale 28 is off the ramp 38. After being ejected from the bale chamber 26 and moving down along the ramp 38, the bale is seated on the soil surface of the agricultural field. As illustrated, the tailgate 30 is partially through the closing process. Additionally, with the ramp 38 in the raised position, the ramp blocks the bale 28 from rolling back toward the bale chamber 26 and into the closing path 50. As mentioned above, if a ramp position sensor were used to determine when to close the tailgate 30, the tailgate 30 would not begin to close until the bale 28 was completely off the ramp 38 and the ramp 38 returned to the raised position. In contrast, as shown in FIG. 4, the tailgate 30 is substantially closed by the time the bale 28 is off the ramp 38 and the ramp 38 is back to the raised position. Accordingly, the delay in the closing process is reduced by starting to close the tailgate 30 while the bale 28 is still on the ramp 38.

Figure 5:
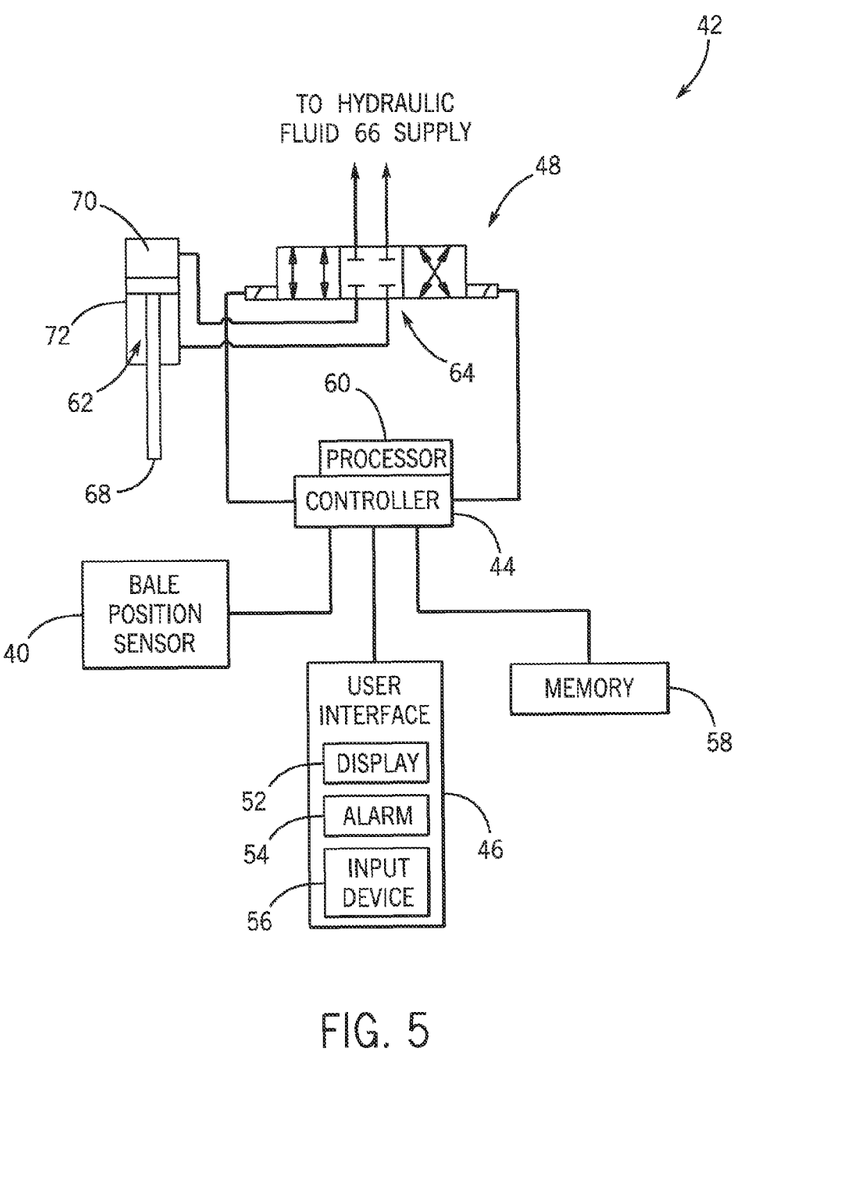
FIG. 5 is a block diagram of an embodiment of an actuator assembly that may be utilized to control the tailgate of the baler of FIG. 2.

FIG. 5 is a block diagram of an embodiment of a control system 42 that may be utilized to control the tailgate 30 of the baler 14. As mentioned above, the control system 42 includes the controller 44, the user interface 46, and the hydraulic control system 48. In the illustrated embodiment, the user interface 46 includes a display 52, an alarm 54, and an input device 56. In some embodiments, the display 52 includes a liquid crystal display (LCD) or other type of projection device and relays a variety of information to the operator. For example, the display 52 may provide an indication of where the bale 28 is on the ramp 38. Additionally, the display 52 may indicate whether the tailgate 30 is open, the fuel level, how many bales 28 have been produced, and diagnostic information related to the engine and hydraulic system. Furthermore, the operator may interact with the display 52 via the input device 56. In some embodiments, the input device 56 includes a touchscreen (e.g., screen which may enable users to interact with a user interface) or separate controls (e.g., switches, knobs, etc.). Along with the display 52, the alarm 54 may be used to relay information about the baling process to the operator. In certain embodiments, the alarm 54 may be a visual indication (e.g., blinking light, flashing light, message on the display 52, etc.) and/or an auditory indication (e.g., buzzer).

In the illustrated embodiment, the control system 42 includes a memory 58 and a processor 60. The memory 58 may be any type of non-transitory machine readable medium for storing data and executable instructions, such as random-access memory, read-only memory, rewritable flash memory, hard drives, optical discs, and the like. The processor 60 may execute instructions stored on the memory 58. For example, the memory 58 may contain machine readable code, such as instructions, that may be executed by the processor 60. In some embodiments, the memory 58 and processor 60 may enable automatic (e.g., processor/memory controlled) baling and ejection of the bale 28.

In the illustrated embodiment, the hydraulic control system 48 includes a hydraulic cylinder 62, a three way valve 64, and hydraulic fluid 66. For example, the hydraulic cylinder 62 may be part of the actuator assembly 32 and configured to rotate the tailgate 30 between the open position and the closed position. That is, the rod 68 of the cylinder 62 may be coupled to the tailgate 30. Movement of the rod 68 within the cylinder 62 translates to the tailgate 30. For example, when the rod 68 is extended, the tailgate 30 may be driven toward the open position. Conversely, when the rod 68 is retracted, the tailgate 30 may be driven toward the closed position.

In some embodiments, the hydraulic control system 48 may be linked to a number of components, including the actuator assembly 32 and/or the ramp 38. For example, the hydraulic control system 48 may direct hydraulic fluid 66 to the cylinder 62 via conduits. In the illustrated embodiment, the controller 44 is configured to send a signal to the three way valve 64 to control the hydraulic fluid flow to the hydraulic cylinder 62. For example, the controller 44 may send a signal to the three way valve 64 that instructs the three way valve 64 to move into a position that enables hydraulic fluid 66 to flow to a cap end 70 of the hydraulic cylinder 62. At the cap end 70, the pressure of the hydraulic fluid 66 causes the rod 68 to extend out of the piston body. As a result, the tailgate 30 moves to the open position. Conversely, the controller 44 may send a signal to the three way valve 64 that instructs the three way valve 64 to move into a position that enables hydraulic fluid 66 to flow to a rod end 72 of the hydraulic cylinder 62. The hydraulic fluid pressure at the rod end 72 drives the rod 68 back into the piston body. To that end, the tailgate 30 moves to the closed position. However, in other embodiments, other types of actuator assemblies 32 may be used. For example, the actuator assembly 32 may include an electric motor to rotate the tailgate 30 between the open and closed positions.

As mentioned above, the bale position sensor 40 is communicatively coupled to the controller 44. The controller 44 determines the position of the bale 28 based on a signal sent to the controller 44 from the bale position sensor 40. The controller 44 then sends control signals to other components. For example, in one embodiment, presence of the bale 28 in contact with or proximate to the bale position sensor 40 activates the bale position sensor 40. The bale position sensor 40, in turn, sends a signal to the controller 44 indicating the bale 28 is not in the cleared position. The controller 44 then sends a signal to the three way valve 64 instructing the valve 64 to block the flow of hydraulic fluid 66 into the hydraulic cylinder 62, thereby blocking the tailgate 30 from closing (e.g., in response to an operator command from the user interface). Then, as the bale 28 continues to move along the ramp 38 the bale position sensor 40 no longer detects presence of the bale 28, indicating that the bale 28 is in the cleared position. The controller 44 then enables the three way valve 64 to move to a desired position (e.g., a position that provides flow to the hydraulic cylinder 62 to facilitate closure of the tailgate 30). In a further embodiment, the controller 44 may be configured to "lock out" the hydraulic control system 48 when the bale 28 is not in the cleared position. In other words, the controller 44 may override commands from an operator to close the tailgate 30 before the bale 28 reaches the cleared position. Once the bale 28 reaches the cleared position, the controller 44 may unlock the system 10 and allow the operator to close the tailgate 30.

In some embodiments, the controller 44 may automatically control the ejection of the bale 28 and the closing of the tailgate 30. That is, the controller 44 may instruct the three way valve 64 to move to a position to flow hydraulic fluid 66 to the cylinder 62 to raise or lower the tailgate 30 in response to the position of the bale 28. For example, sensors within the baler 14 may send a signal to the controller indicating the bale 28 is formed. The controller may then send a signal to the three way valve 64 instructing the valve to move into a position that enables hydraulic fluid 66 to flow to the cap end 70 of the cylinder 62, thereby extending the rod 68 and moving the tailgate 30 to the open position. Then, the bale 28 may move down the ramp 38 and the controller 44 determines that the bale 28 is in the cleared position (e.g., the sensor 40 detects presence of the bale 28, the sensor 40 detects presence of the bale 28 and subsequently does not detect presence of the bale 28). Based on the signal, the controller 44 sends a control signal to the three way valve 64 instructing the three way valve 64 to move into a position that enables hydraulic fluid 66 to flow to the rod end 72 of the cylinder 62, thereby retracting the rod 68 and moving the tailgate 30 to the closed position. In other embodiments, an electric actuator, mechanical actuator, or the like may be used instead of the three way valve 64 and hydraulic fluid 66 to control movement of the tailgate 30.

In another embodiment, the controller 44 may determine the position of the bale 28 based on a signal received from the bale position sensor 40. The controller 44 may then send a signal to the user interface 46 indicative of the bale position (e.g., a visual indication, an auditory alarm, etc.). For example, the controller 44 may send a signal to the user interface 46 indicating that the bale 28 is in the cleared position based on the signal the controller 44 receives from the bale position sensor 40. The signal could be a visual indication (e.g., a flashing message on the display 52, an illuminated section on the display 52, etc.), an auditory alarm, or a combination thereof. Upon receiving the indication from the user interface 46, the operator may manually initiate closure of the tailgate 30. Moreover, the controller 44 may send an alert signal to the alarm 54 when the bale 28 is not in the cleared position to inform the operator not to close the tailgate 30 until the bale 28 reaches the cleared position and/or the user interface 46 may show the bale 28 position on the display.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A baling system, comprising:
a baling chamber configured to form a round bale;
a tailgate rotatably coupled to the baling chamber, wherein the tailgate is configured to rotate between a closed position that facilitates formation of the round bale and an open position that facilitates ejection of the round bale from the baling chamber;
a ramp coupled to the baling chamber and configured to receive the round bale upon ejection from the baling chamber, wherein the ramp is configured to direct the round bale away from the baling chamber to a cleared position on the ramp that enables the tailgate to rotate from the open position to the closed position without contacting the round bale; and
a sensor coupled to a distal end of the ramp, wherein the sensor is configured to detect presence of the round bale in the cleared position on the ramp.

2. The baling system of claim 1, comprising an actuator assembly coupled to the tailgate, wherein the actuator assembly is configured to rotate the tailgate between the open position and the closed position.

3. The baling system of claim 2, comprising a controller communicatively coupled to the sensor and to the actuator assembly, wherein the controller is configured to instruct the actuator assembly to block rotation of the tailgate from the open position to the closed position while the round bale is not in the cleared position.

4. The baling system of claim 1, comprising a controller communicatively coupled to the sensor and a user interface communicatively coupled to the controller, wherein the user interface is configured to receive a signal from the controller indicative of a position of the round bale.

5. The baling system of claim 4, wherein the signal indicative of the position of the round bale is an alert signal indicating the round bale is not in the cleared position.

6. The baling system of claim 4, wherein the signal indicative of the position of the round bale is a clear signal indicating the round bale is in the cleared position.

7. The baling system of claim 3, wherein the actuator assembly comprises a hydraulic system.

8. The baling system of claim 7, wherein the hydraulic system comprises a hydraulic actuator coupled to the tailgate, and a valve assembly communicatively coupled to the controller and configured to control fluid flow to the hydraulic actuator.

9. The baling system of claim 1, wherein the sensor comprises a leaf spring switch, a strain gauge, a momentary switch, or a combination thereof.

10. The baling system of claim 1, wherein the sensor comprises a Hall Effect sensor, an infrared sensor, a capacitive sensor, an ultrasonic sensor, or a combination thereof.

11. A baling system, comprising:
a ramp configured to receive a round bale from a baling chamber, wherein the ramp is configured to direct the round bale away from the baling chamber to a cleared position on the ramp that enables a tailgate to rotate from an open position to a closed position without contacting the round bale; and
a sensor coupled to a distal end of the ramp, wherein the sensor is configured to detect presence of the round bale in the cleared position on the ramp, and wherein the sensor is configured to output a signal indicative of a position of the bale on the ramp.

12. The baling system of claim 11, wherein the sensor comprises a leaf spring switch, a strain gauge, a momentary switch, or a combination thereof.

13. The baling system of claim 11, wherein the sensor comprises a Hall Effect sensor, an infrared sensor, a capacitive sensor, an ultrasonic sensor, or a combination thereof.

14. The baling system of claim 11, wherein the signal indicative of the position of the round bale is an alert signal indicating the round bale is not in the cleared position.

15. A baling system, comprising:
a baling chamber configured to form a round bale;
a tailgate rotatably coupled to the baling chamber, wherein the tailgate is configured to rotate between a closed position that facilitates formation of the round bale and an open position that facilitates ejection of the round bale from the baling chamber;
a ramp coupled to the baling chamber and configured to receive the round bale upon ejection from the baling chamber, wherein the ramp is configured to direct the round bale away from the baling chamber to a cleared position on the ramp that enables the tailgate to rotate from the open position to the closed position without contacting the round bale;
an actuator assembly coupled to the tailgate, wherein the actuator assembly is configured to rotate the tailgate between the open position and the closed position;
a sensor coupled to a distal end of the ramp, wherein the sensor is configured to detect presence of the round bale in the cleared position on the ramp; and
a controller communicatively coupled to the sensor, wherein the controller is configured to instruct the actuator assembly to rotate the tailgate from the open position to the closed position upon detection of the round bale in the cleared position on the ramp.

16. The baling system of claim 15, comprising a hydraulic system communicatively coupled to the controller and configured to rotate the tailgate between the open position and the closed position, wherein the controller is configured to instruct the actuator assembly to block rotation of the tailgate from the open position to the closed position while the round bale is not in the cleared position.

17. The baling system of claim 15, wherein the actuator assembly comprises a hydraulic system.

18. The baling system of claim 17, wherein the hydraulic system comprises a hydraulic actuator coupled to the tailgate, and a valve assembly communicatively coupled to the controller and configured to control fluid flow to the hydraulic actuator.

19. The baling system of claim 15, comprising a user interface communicatively coupled to the controller and configured to send a signal to the controller indicative of a desired position of the tailgate.

20. The baling system of claim 15, wherein the controller is configured to instruct the actuator assembly to rotate the tailgate to the desired position unless the round bale is not in the cleared position.

* * * * *